United States Patent Office 3,060,146
Patented Oct. 23, 1962

3,060,146
POLYESTER OF A DICARBOXYLIC ACID AND A HALOGEN-CONTAINING POLYOL AND MIXTURES THEREOF WITH AN ETHYLENIC MONOMER
Marco Wismer, Richland Township, Allegheny County, Earl E. Parker, Allison Park, and Robert E. Park, New Kensington, Pa., assignors to Pittsburgh Plate Glass Company, Allegheny County, Pa., a corporation of Pennsylvania
No Drawing. Filed July 8, 1958, Ser. No. 747,127
6 Claims. (Cl. 260—45.4)

This invention relates to unsaturated polyesters, such as are used in forming thermosetting resins, and it has particular relation to the formation of polyesters useful in forming thermosetting resins which are flame-resistant.

It has heretofore been disclosed to form polyesters of dihydric alcohols, such as propylene glycol and dicarboxylic acids, at least a part of which are alpha-beta ethylenically unsaturated and being represented by maleic acid or fumaric acid. Often these polyesters also contain as a part of the dicarboxylic acid content, a non-ethylenically unsaturated dicarboxylic acid, such as phthalic acid or adipic acid. It is an important characteristic of these polyesters that they are capable of reacting by addition very rapidly and at moderate temperatures and with but little or no extraneous pressure with liquid $>C=CH_2$ monomers, such as styrene to form hard, thermoset resins.

Since the reaction involved in the formation of these resins is essentially one of addition between the ethylenic groups of the monomers and those occurring along the polyester chains, the curing of the interpolymerizable mixtures comprising polyesters does not generate water or other volatile or otherwise objectionable components as by-products. The mixtures of these polyesters and liquid monomers, such as styrene, are therefore of great merit in forming reinforced laminates, castings and other bodies where removal of water or other by-products of polymerization which are objectionable in the resin, is difficult or not practicable.

Although the resins are characterized by many valuable properties, a high degree of flame resistance does not constitute one of them and in order to obtain this latter property where it is required, various devices have been resorted to. For example, it has been suggested to incorporate a halogen, such as chlorine into the polyester molecule and for this purpose, a halogenated dicarboxylic acid, such as tetrachlorophthalic acid has been employed. These halogenated dicarboxylic acids in part replaced the alpha-beta ethylenically unsaturated dicarboxylic acids and gave polyesters the chains of which included certain amounts of halogen. However, the resultant polyesters as heretofore prepared were not very satisfactory because the introduction of the halogenated phthalic acid component obviously tended strongly to reduce the number of functional, ethylenic groups along the polyester molecule and thus impaired its capacity for cross-linking by addition reaction with ethylenic monomers, such as styrene. In general, the formation of a good fire resistant resin required the presence of about 25 to 30 or 35 percent by weight based upon the resin, of chlorine. If enough halogenated dicarboxylic acid was incorporated to obtain an adequate degree of flame resistance, the capacity for rapid curing was so reduced that the value of the polyester was greatly impaired.

For purposes of providing a mixture which could be effectively interpolymerized and the products of which would still possess an adequate degree of flame resistance, it has been proposed to modify the interpolymerizable mixtures by the inclusion of substantial amounts of halogenated waxes. However, if enough of such wax was added to the mixture to obtain adequate flame resistance, the other desirable properties of the mixture, such as strength, flexibility and resistance to discoloration were seriously impaired.

This invention comprises the provision of polyesters of alpha-beta ethylenically unsaturated dicarboxylic acids which contain an adequate number of functioning ethylenic groups along the chain and which are highly loaded with halogen in the polyester molecule and, therefore, are of a high degree of flame resistance.

In particular this invention comprises the reaction of (A) a diol component containing a halogen with (B) an alpha-beta ethylenically unsaturated dicarboxylic acid, which may or may not contain halogen and being such acids as maleic acid or fumaric acid or a mixture thereof with another dicarboxylic acid, such as phthalic acid, chlorendic acid, tetrachlorophthalic acid, adipic acid or succinic acid, whereby to incorporate halogen in amounts sufficient to give good flame resistance to polymers and interpolymers thereof without reducing the functionality of the polyester molecules through elimination of ethylenic groups.

Diols containing the pentahalophenoxymethyl group in a structure of the formula:

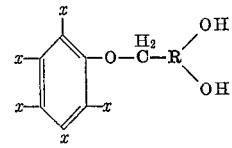

are especially useful. In the formula, $x$ is halogen such as chlorine or bromine and R is an aliphatic hydrocarbon group or a series of such groups interlinked by an oxygen (—O—) bridge and/or bridges and containing about 2 to 10 carbon atoms.

Various methods may be employed in forming these pentahalophenoxymethyl-substituted diols. These include:

(a) Reaction of pentachlorophenol with an epihalohydrin such as epichlorohydrin, in the presence of hydrogen halide acceptor, e.g., caustic soda to form a glycidyl ether which is then hydrolyzed to split the oxirane ring;

(b) Reaction of a hexachlorobenzene with a triol such as trimethylolethane, trimethylolpropane, trimethylolbutane, trimethylolhexane, trimethylolheptane, glycerol and others, also, in the presence of a halogen acceptor such as caustic soda.

As a halogenated diol useful for forming interpolymerizable polyesters in accordance with the provisions of the present invention, emphasis is placed upon 1-pentachlorophenoxy-2,3-propanediol of the structure:

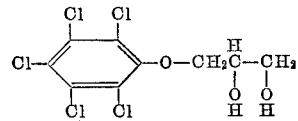

This compound may be regarded as being a glycol and will readily react in well known manner with the dicarboxylic acids or the anhydrides thereof to form the polyesters contemplated in this invention.

Still other diols containing the pentahalophenoxy group, that can also be reacted with a dicarboxylic acid component at least a part of which is alpha-beta ethylenic, to provide a useful fire-resistant, interpolymerizable polyester, are disclosed in a copending and commonly owned application, to Marco Wismer, Serial No. 702,530, filed December 13, 1957, now abandoned. The disclosure of said application and especially the Examples I through V may be relied upon in support of this application.

These include:
2-pentachlorophenoxymethyl-2-ethyl-1,3-propanediol of the formula:

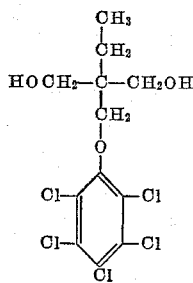

This compound is formed by heating a solution of trimethylol propane with hexachlorobenzene and a halogen acceptor, e.g., caustic soda, in an inert diluent, namely, 1,2-dimethoxyethane.

The 2-pentabromophenoxy methyl-2-ethyl-1,3-propanediol which is of similar structure but with bromine replacing chlorine is also included and is useful as a component in preparing the polyester of flame retarding resins.

The 2-pentachlorophenoxymethyl-2 methyl - 1,3 - propanediol of the formula:

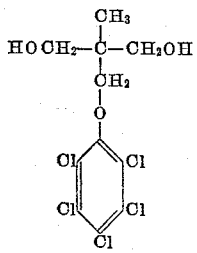

is also included.

These may be grouped under the general formula:

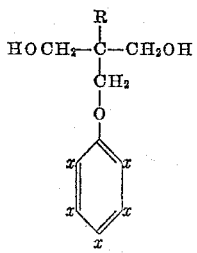

where $x$ is halogen, e.g., chlorine or bromine and R is hydrogen or a hydrocarbon of 1 to 7 carbon atoms in an open chain.

Another pentachlorophenoxymethyl-substituted diol is of the formula:

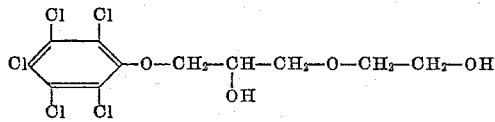

and is termed (1-pentachlorophenoxy-2-hydroxy-3-beta-hydroxyethoxy)-propane and is derivable by reacting a mixture of stannic chloride and the glycidyl ether of the formula:

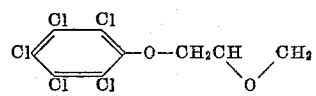

with ethylene glycol in toluene. Other solvents such as xylene, benzene, dioxane, etc. can be used. Likewise, other catalysts, e.g., $Sb_2Cl_5$, $ZnCl_2$, $SnCl_4$, $FeCl_3$, $AlCl_3$, $BF_3$ etherate and Friedel-Crafts catalysts in general may be used.

This diol can also be used to react with maleic acid or its anhydride or with fumaric acid in preparation of polyesters which interpolymerize with polymerizable compounds containing carbon to carbon unsaturation and being represented by $>C=CH_2$ monomers, to form fire-resistant resins.

It will be apparent that propylene glycol, or butylene glycol, or diethylene glycol can be substituted for ethylene glycol and reacted with 1-pentahalophenoxy-2,3 epoxypropane to form ethers of the general structure:

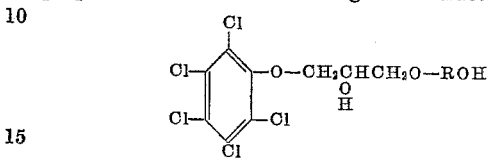

where R is a hydrocarbon group or a series of 2 or more hydrocarbon groups bridged together by —O— bridges. In these, chlorine can be replaced by bromine.

Related diols can be formed by reacting a large amount, e.g., 2 moles or more of the pentahalophenylglycidyl ether, e.g., pentachlorophenyl glycidyl ether, in the presence of a Friedel-Crafts catalyst (e.g., stannic chloride) with a polyol, such as:

Ethylene glycol
Diethylene glycol
Propylene glycol
Dipropylene glycol
Butylene glycol
Trimethylol ethane
Trimethylol propane
Pentaerythritol and others.

The resultant diols are of the formula:

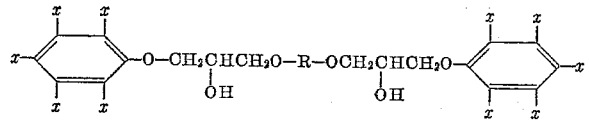

where $x$ is halogen, e.g., chlorine or bromine and R is the organic portion of the polyol component.

The resultant diols can be reacted with maleic anhydride, fumaric acid and other alpha-beta ethylenic dicarboxylic acids and anhydrides, as well as mixtures thereof with saturated dicarboxylic acids and anhydrides, to form polyesters. The polyesters can be reacted with $>C=CH_2$ monomers to form valuable resins.

The polyesters, such as is obtained by reacting 1-pentachlorophenoxy-2,3-propanediol and an alpha-beta ethylenic dicarboxylic acid, such as maleic acid (or the anhydride thereof), can be mixed with liquid $>C=CH_2$ monomers containing negative groups and being represented by styrene, and quickly cured. The products are hard resins of generally good properties, which properties include good flame resistance, good strength, good color, etc.

For purposes of preparing 1-pentachlorophenoxy-2,3-propanediol suitable for use in the practice of the present invention, pentachlorophenol, such as may be prepared by the hydrolysis of hexachlorobenzene or in the chlorination of phenol, may be reacted with epichlorohydrin in the presence of an excess of a hydrogen chloride acceptor, such as sodium hydroxide or other base. The resultant pentachlorophenoxy-glycidyl ethers are then hydrolyzed to form the desired diol.

In order to provide a polyester from 1-pentachlorophenoxy-2,3-propanediol or other of the pentachlorophenoxy compounds, the latter compounds, preferably in slight excess of equivalency (about 5 to about 10 percent excess), are mixed with a desired dicarboxylic acid component, at least a part of which is an alpha-beta ethylenically unsaturated dicarboxylic acid. The mixture is then heated to boiling in the presence of a non-reactive solvent, such as xylene or toluene designed to eliminate the water of reaction in the mixture of off vapors from the reaction vessel.

Alpha-beta ethylenic dicarboxylic acids may be chosen from a class selected from the following partial list:

Maleic acid
Fumaric acid
Methylmaleic acid
Dimethylmaleic acid
Bromomaleic acid
Chloromaleic acid
Ethylmaleic acid
Ethylmethylmaleic acid
Diethylmaleic acid
Itaconic acid A portion of a dicarboxylic acid (or anhydride) free of unsaturation other than benzenoid unsaturation may sometimes be included. These include:

Aromatic dicarboxylic acids such as—
Phthalic acid
Terephthalic acid
Isophthalic acid
Tetrachlophthalic acid
Tetrabromophthalic acid
Alkane dioic acids such as—
Adipic acid
Succinic acid
Bromosuccinic acid
Dibromosuccinic acid
Sebacic acid Heterocyclic dicarboxylic acids such as chlorendic acid or anhydride are also included. They may be used in amounts of about 10 to about 600 molar percent based upon the alpha-beta ethylenic dicarboxylic acid.

While the diols such as 1-pentachlorophenoxy-2,3-propanediol:

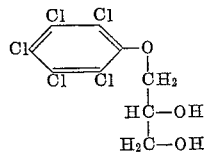

are presently preferred in preparing polyesters, it is to be understood that the corresponding glycidyl ethers of the formula:

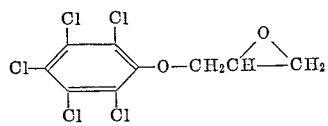

may also be employed in forming the polyesters. This compound is capable of reacting with acids, or with anhydrides of acids, such as maleic anhydride, or fumaric acid or the like, to form a polyester.

The polyesters of either 1-pentahalophenoxy-2,3-propanediol or the pentahalophenylglycidyl ether may be represented by the formula:

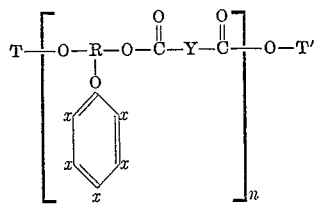

groups in R position being aliphatic hydrocarbon groups; groups in Y position being hydrocarbon, at least a part thereof being ethylenically unsaturated; T being of a class consisting of —H and

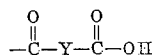

and T' being of a class consisting of H and

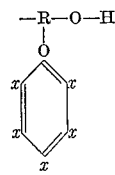

$x$ being halogen and $n$ being a number from 1 to 40.

The character of groups T and T' will depend upon the relative proportions of the pentahalophenyl substituted diol (or its corresponding glycidyl ether employed in place thereof) and the dicarboxylic acid component. The molecular chains will tend to terminate with the component which is in substantial excess. If the two components are present in about equal amounts, the polyester molecules will tend to terminate with hydroxyls and carboxyls in about equal numbers. The number $n$ will also depend upon the ratio of diol to carboxyls; equal moles of each giving long chains and disproportionate amounts of one tending to give short chains. The ratio of polyol to dicarboxylic acid (or anhydride) may be in a range of about one-half to two moles per mole of dicarboxylic component.

It is contemplated to replace all or a part of the 1-pentachlorophenoxy-2,3-propanediol by the corresponding bromo-, iodo-, or fluoro-derivatives in which the chlorine is replaced by equivalent amounts of the latter halogens.

It is also contemplated to replace a part of the diol of the formula:

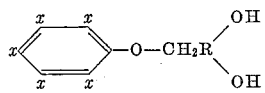

where $x$ and R are of the significance previously given, with a more conventional glycol. Due regard must be given to maintenance of an adequate ratio, e.g., 25 to 50 percent by weight of halogen in the interpolymerizable mixture of polyester and monomer.

Appropriate glycols which may be so used include:

Propylene glycol
Dipropylene glycol
Ethylene glycol
Diethylene glycol
Butylene glycol The esterifiable mixtures comprising the alpha-beta ethylenic dicarboxylic acid, or mixture thereof with acids free of functioning unsaturation and the 1-pentachlorophenoxy alkane diol or mixture thereof with added diol, may be esterified by conventional methods, for example, by heating the mixtures, with or without conventional esterification catalysts, e.g., toluene sulfonic acid. The esterification mixture usually comprises an excess, e.g., 5 to 20 percent of the polyol component. The temperature is such as to evolve water, which is a criterion of reaction. Often a non-reactive solvent which is insoluble in, but forms a constant boiling mixture with evolved water is included. Reaction is continued until water ceases to evolve or until a low acid value or a desired viscosity is reached.

Polyesters prepared from a pentachlorophenoxy, substituted diol and an alpha-beta ethylenic dicarboxylic acid can be mixed with various >C=CH$_2$ monomers of which the following constitutes a partial list from which selection can be made:

Ethylenic hydrocarbons such as—
Styrene
Alphamethyl styrene
Vinyl toluene
Divinyl benzene
Ethylenic esters such as—
Diallyl phthalate
Vinyl acetate Vinyl propionate
Ethyl acrylate
Methyl acrylate
Methyl methacrylate
Diallyl itaconate
Diallyl carbonate
Diallyl terephthalate
Corresponding methallyl esters
Vinyl ethers up to vinyl butyl ether
Halides such as—
  Chlorostyrene
  Dichlorostyrene
Nitriles such as—
  Acrylonitrile
  Methacrylonitrile and others. These are usually polymerizable liquids and contain a terminal $>C=CH_2$ group attached to a negative radical. For purposes of providing interpolymerizable mixtures in accordance with the provisions of the present invention, the monomers may be incorporated with the polyesters in amounts variable within a range of about 5 to about 50 percent by weight based upon the interpolymerizable mixture.

In order to provide interpolymerizable mixtures which can be stored for substantial periods of time without likelihood of premature gelation, it is preferred to incorporate into the mixture of polyester and ethylenic monomer or into one or both components of the mixture, an appropriate inhibitor. Such inhibitors include hydroquinone, 3-isopropyl catechol, tertiary butyl catechol, 3,6 dinormalpropyl catechol and other phenolic inhibitors. These inhibitors preferably are added in amounts of 0.001 percent to about 0.1 percent by weight based upon the interpolymerizable mixture. Still other inhibitors of premature gelation comprise the quaternary ammonium salts of relative strong non-oxidizing acids. This class is disclosed in Parker Patent 2,593,787 of April 22, 1952. The inhibitor, preferably, is added to the polyester component, if necessary, while the latter is hot and liquid. It may even be cooked into the polyester.

The resultant polyester containing gelation inhibitor may then be incorporated with the monomer without danger of premature gelation during the mixing operation or during a subsequent period of storage, at least within reasonable limits.

The preparation of a 1-pentachlorophenyl glycidyl ether that can be esterified directly, or that can be hydrolyzed to provide 1-pentachlorophenoxy-2,3-propanediol is illustrated upon a microplant scale as follows:

EXAMPLE A

The apparatus used comprises a 4-necked flask equipped with a condenser, an azeotropic trap, an agitator, a thermometer and a heating mantle.

The flask is charged with:

| | Parts by weight |
|---|---|
| Pentachlorophenol | 437 |
| Epichlorohydrin | 613 |
| Caustic soda | 13.5 |

The mixture is agitated and heated up to about 90 degrees C. and 500 grams of additional epichlorohydrin is incorporated to increase fluidity. The mixture is then agitated and heated up to 100 degrees C. over a period of about 45 minutes. Added sodium hydroxide is incorporated to provide a charge comprising:

| | Parts by Weight | Moles |
|---|---|---|
| Pentachlorophenol | 437 | 1.64 |
| Epichlorohydrin | 1,113 | 12.1 |
| Caustic Soda | 66.9 | 1.67 |

The charge is further heated at 100 degrees C. for about 3 hours to provide a substantially neutral product. The product, which is largely 1-pentachlorophenyl-glycidyl ether and sodium chloride diluted with epichlorohydrin, may be further diluted with 1113 grams of additional epichlorohydrin and washed with water to remove the sodium chloride of reaction.

The 1-pentachlorophenyl-glycidyl ether obtained from the solution by distilling off of the epichlorohydrin is of an epoxy equivalent of 327.4 as against a theoretical equivalent of 322.

The 1-pentachlorophenyl glycidyl ether may be hydrolyzed to form 1-pentachlorophenoxy-2,3-propanediol. A typical charge comprises:

| | Parts by weight |
|---|---|
| Pentachlorophenyl-glycidyl ether | 80 |
| Water | 80 |
| Sulfuric acid (concentrated) | 8 |

The mixture is dissolved in 80 grams of a non-reactive solvent namely dioxane.

The charge is heated in a 2-necked flask equipped with a water condenser and a thermometer, until it gives a negative test for epoxy groups, or for about 23 hours. The solution, while hot, is filtered. The dioxane and water are removed by distillation to provide a crude, 1-pentachlorophenoxy-2,3-propanediol product melting at about 83 degrees C. to 94 degrees C. The product has a hydroxyl value of 308.4 as compared with a theoretical value of 338.

The product and products similarly prepared, may be further purified by crystallization from a mixture of acetone and heptane or by crystallization from benzene. If desired, the color can be improved by filtration in the presence of a filter aid such as activated charcoal.

As a specific example, purification may be conducted as follows:

Crude brown product having a solids content of 74.4 percent and of a hydroxyl value of 180.9, or 243 calculated upon the basis of 100 percent solids, is crystallized 4 times from benzene containing 10 percent by weight based upon the diol material, of activated charcoal and is then further subjected to a single crystallization from benzene alone.

A very fluffy, white, crystalline material is obtained. This has a solids content of 99.6 percent and a hydroxyl value upon the basis of total solids, of 320 as against a theoretical hydroxyl value of 330. The product melts to a colorless liquid state and can be mixed with an alpha-beta ethylenic dicarboxylic acid to provide a polyester which can be interpolymerized with $>C=CH_2$ monomers to provide useful resins.

The use of the 1-pentachlorophenoxy-2,3-propanediol in forming polyesters and the subsequent incorporation thereof into flame-resistant interpolymers is illustrated by the following example:

EXAMPLE I

In preparing a polyester in accordance with this example, a charge is made up comprising:

| | Parts by weight |
|---|---|
| 1-pentachlorophenoxy-2,3-propanediol | 255 |
| Propylene glycol | 27 |
| Maleic anhydride | 98 |
| Hydroquinone (gelation inhibitor) | 0.038 |

To this mixture is added a small amount (e.g., about 5 to 10 percent) of toluene as a reflux medium and the mixture is heated under reflux with removal of water of reaction until an acid value of about 57.5 and a temperature of 175 degrees C. are attained. During the course of the reaction, approximately 10.5 parts by weight of water are removed. The product is a polyester of maleic acid and 1-pentachlorophenoxy-2,3-propanediol.

In the specific example, the reaction required 2 hours, 45 minutes for completion. However, this time obviously will vary, dependent upon the rate of heating and the quantities of ingredients employed, as well as other factors.

A portion of this polyester comprising 297 parts by weight is mixed with 105 parts by weight of styrene and 1 percent by weight of benzoyl peroxide to provide an interpolymerizable mixture of a viscosity of Y+. The mixture has a gel time of 3.3 minutes by the Society of Plastic Industry method. The interpolymerizable material has a tank life, when incorporated with 1 percent of benzoyl peroxide, of about 20 hours at 100 degrees F.

The mixture is poured into a mold and cured at a temperature of 140 degrees F. to effect gelation, for 1 hour at 170 degrees F. and for 1 hour at 250 degrees F. to effect final cure. (This schedule is hereinafter adhered to in subsequent interpolymerizations.)

The resultant castings are of the following characteristics:

Flexural strength (A.S.T.M.[1] D 790–49T) _____ 9700 p.s.i.
Modulus in flexure (A.S.T.M.[1] D 790–49T) _____ $0.607 \times 10^6$.
Barcol hardness _____ 51–54.

[1] The flexural strengths and moduli in flexure as hereinafter given are determined by the methods of these cards.

Sheets of resin 1/8 inch thick, when ignited by the flame of a Bunsen burner applied for 30 seconds will extinguish themselves in 2 to 4 seconds. This is a more severe test than the ASTM test. A sheet of an interpolymer of styrene and a polyester of propylene glycol and the same acid will flame for more than 30 seconds, and will burn up without extinguishing itself.

The interpolymerizable mixture can be used to impregnate mats and fabrics of fiber glass, and thus to provide laminates of good fire resistance and good strength and hardness.

EXAMPLE II

In accordance with this example, a reaction vessel is charged with a mixture of the following composition:

Grams
1-pentachlorophenoxy-2,3-propanediol _____ 370
Fumaric acid _____ 116

To the mixture is added a small amount of toluene and the mixture is refluxed in a flask for a period of about 4 hours to an acid number of 57. At this point, it is blown with inert gas to remove the solvent and the charge is then emptied from the flask. During the course of the reaction, 37.7 parts by weight of water are removed and collected. The acid value of the product is 48.

The product is a polyester which in an amount of 337 parts by weight, is mixed with 170 parts by weight of styrene to provide a mixture of a viscosity of Y+ on the Gardner-Holdt scale. This mixture when stabilized with a suitable inhibitor, such as hydroquinone or tertiary butyl catechol in an amount of about 0.02 percent by weight based on the mixture, can be stored for long periods of time without gelation.

In order to cure the mixture, benzoyl peroxide in an amount of about 1 percent by weight based upon the mixture is incorporated.

In this and the other examples, benzoyl peroxide may be replaced by other catalysts, such as:

Cumene hydroperoxide
    Lauroyl peroxide
    Methylethyl ketone peroxide
    Tertiary butyl hydroperoxide
    Cyclohexyl hydroperoxide
    Acetyl peroxide.

These may be used in amounts of about 0.1 to 5 percent by weight based upon the mixture.

It is not precluded to include promoters such as thioglycollic acid, quaternary salts, such as are disclosed in Parker Patent 2,740,765, cobalt naphthenate, and others. These coact with the catalyst to give very fast cures. These may be used in amounts of about 0.001 to about 2.0 percent by weight based upon the total mixture. The promoters or accelerators are not essential, but do greatly increase the activity of the catalyst.

The resin when cured, has a Barcol hardness of 40–45. A sheet of this product 1/8 inch thick when ignited extinguishes itself in 3 seconds. The resin is suitable for forming castings. It may also be incorporated into fabrics and mats of fibrous material, such as fiber glass to provide laminates of high strength, hardness and resistance to flame.

EXAMPLE III

The charge for the polyester of this example comprises:

Parts by weight
1-pentachlorophenoxy-2,3-propanediol _____ 388
Maleic anhydride _____ 98

To the mixture is added a small amount (about 5 to 10 percent) of toluene as a reflux medium. The mixture is cooked to acid value of 56 or until 16 parts by weight of water are removed. It is then blown with inert gas to remove the solvent. The final acid number is 39.

This polyester can be mixed with styrene or other monomer and catalyst, such as benzoyl peroxide. The mixtures can be cured to provide hard, flame-resistant resin of good quality.

Non-reactive plasticizers and flame retardants are not usually required in the resins, but are not precluded. They are added in appropriate amount (e.g., 1 to 25 percent by weight based upon the interpolymerizable mixture). Appropriate flame retardants which may be used comprise organic phosphates, such as tricresyl phosphate, chlorinated paraffin wax, tri(betachloroethyl) phosphate, tri(betabromoethyl) phosphate and others.

EXAMPLE IV

In this example a useful novel brominated diol, namely, 1-pentabromophenoxy-2,3-propanediol is prepared by methods like those employed in the preparation of the corresponding pentachlorophenoxy-2,3-propanediol.

In the reaction, the following components are utilized:

Parts by weight
Pentabromophenol _____ 696
Epichlorohydrin _____ 1390
NaOH _____ 70

The procedure comprises charging the pentabromophenol and epichlorohydrin into a flask equipped with an azeotropic separator, a water condenser, an agitator and a thermometer. The mixture is heated to 103 degrees C. and 12 parts by weight of the caustic soda is added. Thereafter, 4 increments of 12 parts by weight of caustic soda are added over a period of 1 hour. Finally, after a further 20 minutes, the last increment (10 parts by weight) is added and the mixture is further heated for 4 hours, 20 minutes. During the reaction, 28 parts by weight of water of reaction is collected.

The charge is diluted to a viscosity suitable for filtration, with epichlorohydrin and is filtered while hot, through fritted glass. The filtered solution is placed in the cold room overnight.

The resultant precipitated 1-pentabromophenoxyglycidyl ether is filtered, sucked dry and is washed twice with cold methylethyl ketone. The product is dried under vacuum overnight to obtain 406.5 parts by weight of product.

The mother liquor is concentrated and placed in the cold room. The precipitated product is again filtered, sucked dry, placed in the vacuum chamber. A second crop, in an amount of 108.4 parts by weight, is obtained. Solids comprising 100 percent by weight of the product are of an actual epoxy equivalent of 540. The theoretical equivalent is 544.6. The product is essentially 1-pentabromophenoxy-2,3-epoxypropane.

The 1-pentabromophenoxy-2,3-epoxypropane may be dissolved in a non-reactive diluent such as dioxane and hydrolyzed with water to form 1-pentabromophenoxy-2,3-propanediol. Hydrolysis can be expedited by inclusion of a catalyst, such as a small amount of an acid, such as a strong mineral acid, e.g., sulfuric acid in the mixture.

A typical charge comprises:

| | Parts by weight |
|---|---|
| 1-pentabromophenoxy-2,3-epoxypropane | 448.0 |
| Dioxane | 2240.0 |
| Water | 330.0 |
| $H_2SO_4$ | 19.5 |

The mixture is refluxed for about 12–15 hours and the acid is neutralized with caustic soda. The dioxane is then distilled off azeotropically with water, more water being added to maintain a fluid, distillable mixture. Subsequently 1700 parts by weight of toluene is added and the mixture is agitated and refluxed until the water has been removed. More toluene is added to effect solution of the product at 100 degrees C., the solution is filtered and placed in the cold room. The product separates out as light brown crystals.

The product is essentially 1-pentabromophenoxy-2,3-propanediol. It can be reacted in stoichiometric ratio or excess (5–20 percent excess), with maleic acid or (anhydride) or fumaric acid to form a polyester which is a novel compound.

The 1-pentabromophenoxy-2,3-propanediol has the following properties:

Melting point 142.5–143 degrees C.
Hydroxyl value: theoretical 199.5. Found 197.1.

*Microanalysis*

| | Theoretical | Found |
|---|---|---|
| Carbon | 19.20 | 19.25 |
| Hydrogen | 1.24 | 1.23 |
| Bromine | 71.02 | 70.89 |

The charge for the polyester of this example comprises:

| | Parts by weight |
|---|---|
| 1-pentabromophenoxy-2,3-propanediol | 309 |
| Propylene glycol | 95 |
| Maleic anhydride | 172 |
| Hydroquinone [1] | 0.06 |

[1] The hydroquinone constitutes a gelation inhibitor for the resin mixture of polyester and >C=CH$_2$ monomer and is cooked into the polyester at this stage.

The foregoing charge is heated to 175 degrees C. and is refluxed with about 5 to 10 percent of toluene, which constituted a non-reactive diluent or solvent, to an acid value of 58.

The solvent is removed by sparging with inert gas to a final acid value of the polyester of 47.

The polyester is then mixed with styrene (monomer) to form an interpolymerizable mixture of the following composition:

| | Parts by weight |
|---|---|
| Polyester | 454 |
| Styrene | 166 |

This mixture is stable and can be stored for reasonable periods without fear of gelation.

To cure the mixture, add 1 percent by weight based upon the mixture of a peroxidic catalyst and cure by the procedure described in Example I.

A test sheet cast from this mixture has the following characteristics:

| | |
|---|---|
| Barcol hardness | 48–55. |
| Flexural strength | 11,100 p.s.i. |
| Modulus in flexure | $0.6 \times 10^6$. |
| Flame resistance (self extinguishing) | 0.4 second. |

EXAMPLE V

*2-Pentachlorophenoxymethyl-2-Methyl-1,3-Propanediol*

The reaction charge in this instance, comprises:

| | Parts by weight |
|---|---|
| Trimethylol ethane | 60.0 |
| Hexachlorobenzene | 182.3 |
| Dimethyl ether of diethylene glycol (solvent) | 900.0 |
| Trimethylbenzyl ammonium chloride (catalyst) | 0.88 |
| Sodium hydroxide | 23.4 |

The trimethylol ethane, the hexachlorobenzene and the solvent are first charged into a flask equipped with stirrer, a reflux condenser and a thermometer. The charge is heated and stirred. The mixture goes into solution at 138 degrees C and reflux temperature is reached at 165 degrees C. The caustic is added in five approximately equal increments over a period of about 2 hours while heating to maintain refluxing is continued. Refluxing is continued for 5 additional hours.

The mixture is then neutral and is cooled and some precipitated sodium chloride of reaction is filtered off. A clear, light yellow filtrate is obtained. The solvent (dimethyl ether of diethylene glycol) is distilled from the filtrate under a vacuum of 0.2 to 0.5 mm. (absolute). Further sodium chloride to a total weight of 29.9 grams precipitates at a pot temperature of 66 degrees C and under a vacuum of 0.2 mm. All of the dimethyl Carbitol is distilled leaving a brown, partly-crystalline product. The crude product is recrystallized 6 times from benzene to give a white clear crystalline product melting at 140.8 degrees C. to 141.9 degrees C and an OH value of 299 (theory 303).

A microanalysis of this material gives the following values:

| | Actual percent | Theoretical percent |
|---|---|---|
| Carbon | 36.02 | 35.84 |
| Hydrogen | 3.09 | 2.99 |
| Chlorine | 48.00 | 48.14 |

This product can be reacted with maleic or fumaric acid in the manner already described to give a polyester useful for interpolymerization with styrene and other monomers to form interpolymer resins.

In like manner, 2-pentachlorophenoxymethyl-2-ethyl-1,3-propanediol can be prepared as described in Example V by replacing trimethylol ethane with trimethylol propane. The latter polyol has the following properties:

| | Theoretical | Found |
|---|---|---|
| Carbon, percent | 37.77 | 37.65 |
| Hydrogen, percent | 3.44 | 3.43 |
| Chlorine, percent | 46.22 | 46.32 |
| OH value | 293.4 | 293.7 |

M.P.=115.5–118 degrees C.

In the preparation of a polyester of 2-pentachlorophenoxymethyl-2-ethyl-1,3-propanediol and maleic acid, a charge is prepared comprising:

| | Parts by weight |
|---|---|
| 2-pentachlorophenoxymethyl-2-ethyl-1,3-propanediol | 476 |
| Maleic anhydride | 125 |

No solvent is required. The mixture is cooked to an acid number of about 30 and a hydroxyl number of about 127.

In order to provide an interpolymerizable mixture, the polyester is mixed with styrene to provide a stable composition comprising:

| | Parts by weight |
|---|---|
| Polyester | 75 |
| Styrene | 25 |
| Hydroquinone (stabilizer) | 0.015 |

The uncatalyzed mixture is stable for about 7 days at 150 degrees F. The mixture is catalyzed with 1 percent by weight, e.g., benzoyl peroxide and is cured as previously described.

The properties of the last resin are as follows:

| | |
|---|---|
| Barcol hardness | 48–54. |
| Flame-resistance (self-extinguishing) | 8 seconds. |
| Water absorption (ASTM) D570–42 | 0.043 percent. |
| Heat distortion (ASTM) D648–45T | 85 degrees C. |
| Flexural strength | 8000 p.s.i. |
| Modulus in flexure | $0.64 \times 10^6$. |
| Izod impact (notched) (ASTM) D–256–47T | 0.117 ft.lbs./inch. |

EXAMPLE VI

This example is illustrative of the preparation of a polyester of 1-pentachlorophenoxy-2,3-propanediol and a mixture of maleic anhydride and adipic acid. The reaction charge comprises:

| | Parts by weight |
|---|---|
| 1-pentachlorophenoxy-2,3-propanediol | 205 |
| Maleic anhydrid | 44 |
| Adipic acid | 22 |
| Hydroquinone | 0.027 |

The mixture is cooked to an acid number of 52 and has a final hydroxyl value of 123.

This polyester is mixed with styrene to form a stable interpolymerizable mixture of a viscosity of Q on the Gardner-Holdt scale. To cure the same, add a catalyst, such as benzoyl peroxide in an amount of about 1 percent by weight. Castings and laminates may be made and cured by the schedule already given.

The characteristics of a casting so formed are:

| | |
|---|---|
| Flexural strength | 9600 p.s.i. |
| Modulus in flexure | $0.507 \times 10^6$. |
| Barcol hardness | 42–47. |
| Flame resistance (self-extinguishing) | 2.0 seconds. |

EXAMPLE VII

The polyester of this example is of 1-pentachlorophenoxy-2,3-propanediol and a mixture of maleic anhydride and phthalic anhydride. The charge comprises:

| | | |
|---|---|---|
| 1-pentachlorophenoxy-2,3-propanediol | parts by weight | 255 |
| Maleic anhydride | do | 55 |
| Phthalic anhydride | do | 28 |
| Hydroquinone | do | 0.034 |
| Toluene | percent | 5 to 10 |

The mixture is cooked to a stage giving the following characteristics:

| | |
|---|---|
| Acid value | 50.5 |
| Hydroxyl value | 120 |

The polyester is mixed with styrene to provide a mixture comprising:

| | Parts by weight |
|---|---|
| Polyester | 230 |
| Styrene | 85 |

The mixture can be stored and has a SPI gel time of 4.4 minutes.

When catalyzed with 1 percent by weight (based upon the mixture) of benzoyl peroxide, it cures in the manner already described to a resin having the following characteristics:

| | |
|---|---|
| Flexural strength | 6000 p.s.i. |
| Modulus in flexure | $0.58 \times 10^6$. |
| Barcol hardness | 45–50. |
| Flame resistance (self-extinguishing) | 1.5 seconds. |

EXAMPLE VIII

In this example, a polyester comprises as its diol component, a mixture of 1-pentachlorophenoxy-2,3-propanediol and propylene glycol and as its dicarboxylic acid component, maleic anhydride and phthalic anhydride. The esterification charge comprises:

| | Parts by weight |
|---|---|
| 1-pentachlorophenoxy-2,3-propanediol | 205 |
| Propylene glycol | 27 |
| Maleic anhydride | 74 |
| Phthalic anhydride | 37 |
| Hydroquinone | 0.039 |

The mixture is refluxed with about 5 to about 10 percent by weight, based upon the mixture, of toluene and is then sparged with inert gas to give a polyester having the following characteristics:

| | |
|---|---|
| Acid value | 54 |
| Hydroxyl value | 118 |

An interpolymerizable mixture is prepared from this polyester comprising:

| | Parts by weight |
|---|---|
| Polyester | 270 |
| Styrene | 95 |

This mixture, when catalyzed with 1 percent by weight based upon the mixture, of benzoyl peroxide, has a SPI gel time of 4.3 minutes.

Castings cured in accordance with the schedule given in previous examples, have the following characteristics:

| | |
|---|---|
| Flexural strength | 7500 p.s.i. |
| Modulus in flexure | $0.538 \times 10^6$. |
| Barcol hardness | 47–50. |
| Flame resistance (self-extinguishing) | 1.5 seconds. |

EXAMPLE IX

The polyester of this example is of a mixture of 1-pentachlorophenoxy-2,3-propanediol and diethylene glycol with maleic anhydride.

The esterification charge comprises:

| | | |
|---|---|---|
| 1-pentachlorophenoxy-2,3-propanediol | parts by weight | 255 |
| Diethylene glycol | do | 27 |
| Maleic anhydride | do | 98 |
| Hydroquinone | do | 0.038 |
| Toluene (based upon the charge) | percent | 5 to 10 |

The mixture is refluxed and finally sparged to remove solvent.

The properties of the product are:

| | |
|---|---|
| Acid number | 46.8 |
| Hydroxyl value | 118 |

This polyester is mixed with styrene to provide an interpolymerizable mixture of the composition:

| | Parts by weight |
|---|---|
| Polyester | 255 |
| Styrene | 95 |

This mixture, when catalyzed with 1 percent by weight based upon the mixture, of benzoyl peroxide, has a SPI gel time of 2.9 minutes and a tank life of 9–13 hours at 100 degrees F.

The catalyzed mixture forms castings which, when cured by the foregoing schedule, have the following characteristics:

| | |
|---|---|
| Flexural strength | 14,100 p.s.i. |
| Modulus in flexure | $0.519 \times 10^6$. |
| Barcol hardness | 45–50. |
| Flame resistance (self-extinguishing) | 30 seconds. |

Other catalysts than benzoyl peroxide can be used in curing the resin.

EXAMPLE X

This example illustrates the stages comprising:
(a) The preparation of (1-pentachlorophenoxy-2-hydroxy-3-beta-hydroxyethoxy) propane of the formula:

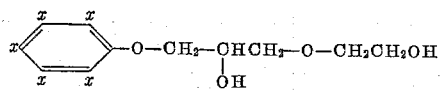

(b) Subsequent conversion thereof to a polyester; and
(c) Interpolymerization thereof with a monomer to provide a fire-retardant resin.

STAGE a

A flask is charged with:

| | Parts by weight |
|---|---|
| Ethylene glycol | 400 |
| Stannic chloride | 2 |

The mixture is heated up to about 92 degrees C. and 161 grams of 1-pentachlorophenoxy-2,3-epoxypropane is added over a period of 45 minutes. The mixture is then

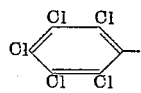

further heated for 1¼ hours during which time the temperature rises to about 123 degrees C.

The reaction product is stripped of excess ethylene glycol under a vacuum of 10 mm. (absolute) at 80-97 degrees C. the recovery being 349 parts by weight (theoretical amounts equals 369).

In a similar procedure, essentially, the same procedure is again followed but in this instance, the reactants are:

| | Parts by weight |
|---|---|
| 1-pentachlorophenoxy-2,3-epoxypropane | 483 |
| Stannic chloride (catalyst) | 6 |
| Ethylene glycol | 900 |

The crude products obtained in the foregoing procedures can be purified by recrystallization from benzene. The material so purified has a melting point of 92-93 degrees C.

The microanalysis of 1-pentachlorophenoxy-2-hydroxy-3-betahydroxy-ethoxypropane is:

| | Found | Theoretical |
|---|---|---|
| Carbon | 34.91 | 34.33 |
| Hydrogen | 2.88 | 2.86 |
| Chlorine | 46.22 | 46.16 |

In the foregoing reactions of this example, ethylene glycol may be replaced by such other polyols as propylene glycol, butylene glycol, diethyleneglycol, dipropylene glycol, trimethylol ethane, pentaerythritol, and others.

STAGE b

In the reaction of 1-pentachlorophenoxy-2-hydroxy-3-betahydroxy-ethoxy-propane with maleic anhydride to form a polyester, the charge comprises:

| | |
|---|---|
| Polyol (as above) parts by weight | 909 |
| Maleic anhydride do | 226 |
| Toluene (based upon the charge) percent | 5 to 10 |

The mixture is refluxed and is finally blown with inert gas to an acid number of 54 and a hydroxyl value of 172.

STAGE c

The resultant polyester from Stage b is mixed with styrene and hydroquinone to provide a stable mixture of the composition:

| | Parts by weight |
|---|---|
| Polyester (as above) | 750 |
| Styrene | 250 |
| Hydroquinone | 0.15 |

If desired, an ultraviolet absorber may also be included but is optional.

To the mixture is added 1 percent by weight of benzoyl peroxide.

The curing cycle is the same as in the preceding examples.

The properties of the cured cast resin are:

| | |
|---|---|
| Barcol | 30-40. |
| Flexural strength | 11,000 to 14,000 p.s.i. |
| Modulus in flexure | $0.35 \times 10^6$. |
| Heat distortion | 53. |
| Flammability (self-extinguishing) | 5 seconds. |

After 2,000 hours in the weatherometer, this material shows less deterioration than a material containing 3,4,5,6,7,7 - hexachloroendomethylene - $\Delta^4$ - hexahydrophthalic acid.

The reaction in the presence of stannic chloride of 1 mole of ethylene glycol with at least 2 moles of pentachlorophenylglycidyl ether yields a compound of the formula:

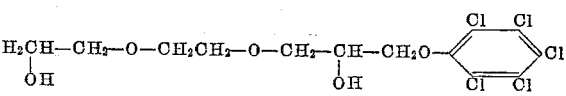

The product is a diol which can be used to form polyesters as herein disclosed.

In this reaction, pentachlorophenyl glycidyl ether can be replaced by pentabromophenylglycidyl ether. Likewise, ethylene glycol can be replaced by other polyols, such as diethylene glycol, triethylene glycol, propylene glycol, dipropylene glycol, butylene glycol and others.

It is not precluded to react mixtures, for example, equal molar mixtures of pentachlorophenyl glycidyl ether and 1-pentachlorophenoxy-2,3-propanediol in the presence of stannic chloride to provide a diol of the structure:

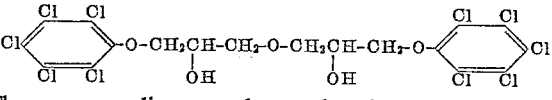

The corresponding pentabromophenyl compounds may also be used in this reaction. Likewise, one compound, for example the pentachlorophenylglycidyl ether, may be replaced by the pentabromophenyl compound to give mixed compounds in which one pentahalophenyl group is brominated, while the other is chlorinated.

We claim:
1. As a new material, a mixture of:
   (I) a polyester consisting essentially of:
      (A) a dicarboxylic acid component consisting essentially of carbon, hydrogen and oxygen, and at least a part thereof being alpha, beta-ethylenically unsaturated and any part which is not alpha, beta-ethylenically unsaturated being free of ethylenic unsaturation; and
      (B) a polyol material selected from the class consisting of (1) a material of the formula:

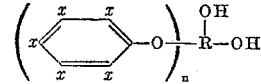

n being a whole number from 1 to 2, x being halogen and R being an alkane radical of 3 to 10 carbon atoms per molecule, and (2) a mixture of the latter material and a material which is a glycol, all of the halogen in the polyester being supplied by the polyol; and
   (II) a monomer containing a $>C=CH_2$ group.
2. The flame retardant product obtained by heating the mixture defined in claim 1 in the presence of a peroxidic catalyst.
3. A polyester consisting essentially of 1-pentahalophenoxy-2,3-propanediol and an ethylenic dicarboxylic acid consisting essentially of carbon, hydrogen and oxygen, all of the halogen in the polyester being supplied by the polyol.

4. A polyester consisting essentially of 1-pentachlorophenoxy-2,3-propanediol and maleic anhydride, all of the halogen in the polyester being supplied by the polyol.

5. A new material consisting of a polyester of the structure:

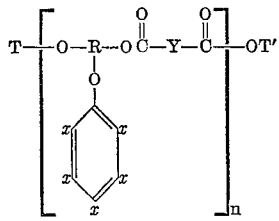

the groups in position R being saturated aliphatic hydrocarbon, the groups in position Y being hydrocarbon, at least some of which are ethylenically unsaturated; T being of a class consisting of —H,

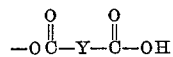

and T' being of a class consisting of —H and

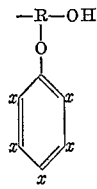

$x$ being halogen and $n$ being a number from 1 to 40.

6. As a new material, a polyester consisting essentially of:

(A) a dicarboxylic acid component consisting essentially of carbon, hydrogen and oxygen, and at least a part thereof being alpha, beta-ethylenically unsaturated and any part which is not alpha, beta-ethlenically unsaturated being free of ethylenic unsaturation; and (B) a polyol material selected from the class consisting of (1) a polyol of the formula:

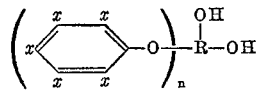

$n$ being a whole number from 1 to 2, $x$ being halogen and R being an alkane radical of 3 to 10 carbon atoms per molecule, and (2) a mixture of the latter material and a material which is a glycol, all of the halogen in the polyester being supplied by the polyol.

References Cited in the file of this patent

UNITED STATES PATENTS

| | | |
|---|---|---|
| 2,416,263 | MacMullen | Feb. 18, 1947 |
| 2,634,296 | Morris et al. | Apr. 7, 1953 |
| 2,694,736 | Pasedach | Nov. 16, 1954 |
| 2,779,701 | Robitschek et al. | Jan. 29, 1957 |
| 2,819,247 | Lundberg et al. | Jan. 7, 1958 |
| 2,851,437 | Petropoulas | Sept. 9, 1958 |
| 2,855,379 | Heinen | Oct. 7, 1958 |
| 2,912,409 | Nischk et al. | Nov. 10, 1959 |

UNITED STATES PATENT OFFICE
CERTIFICATE OF CORRECTION

Patent No. 3,060,146                            October 23, 1962

Marco Wismer et al.

It is hereby certified that error appears in the above numbered patent requiring correction and that the said Letters Patent should read as corrected below.

Column 2, line 50, for "dial" read -- diol --; column 13, line 69, for "0.58 x $10^6$" read -- 0.528 x $10^6$ --; column 15, line 33, for "amounts" read -- amount --; column 16, line 16, for "deteriation" read -- deterioration --.

Signed and sealed this 3rd day of March 1964.

(SEAL)
Attest:
ERNEST W. SWIDER                                    EDWIN L. REYNOLDS Attesting Officer                                    Acting Commissioner of Patents